United States Patent
Sato (10) Patent No.: US 8,420,242 B2
(45) Date of Patent: Apr. 16, 2013

(54) CELL MODULE

(75) Inventor: Seiichi Sato, Hitachinaka (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 907 days.

(21) Appl. No.: 12/351,012

(22) Filed: Jan. 9, 2009

(65) Prior Publication Data

US 2009/0181288 A1    Jul. 16, 2009

(30) Foreign Application Priority Data

Jan. 10, 2008   (JP) .................. 2008-003259

(51) Int. Cl.
*H01M 2/36* (2006.01)
*H01M 2/12* (2006.01)
*H01M 2/24* (2006.01)

(52) U.S. Cl.
USPC ............ 429/72; 429/82; 429/87; 429/88; 429/160

(58) Field of Classification Search ........ 429/72, 429/82, 87, 88, 160
See application file for complete search history.

(56) References Cited

U.S. PATENT DOCUMENTS

| 2004/0043287 A1* | 3/2004 | Bando et al. ............ 429/156 |
| 2005/0212477 A1 | 9/2005 | Uchida et al. |
| 2009/0274952 A1* | 11/2009 | Wood et al. ............ 429/99 |

FOREIGN PATENT DOCUMENTS

| GB | 130545 A | 1/1919 |
| GB | 169541 A | 7/1920 |
| JP | 10-270095 | 10/1998 |
| JP | 2005-322434 | 11/2005 |

OTHER PUBLICATIONS

Extended European Search Report dated Jun. 5, 2012; Application No. 09000242.9-2119/2093819.

* cited by examiner

*Primary Examiner* — Helen O Conley (74) *Attorney, Agent, or Firm* — Antonelli, Terry, Stout & Kraus, LLP.

(57) ABSTRACT

A cell module has a cell group with a plurality of cells connected to each other. The module comprises a bus bar plate including a bus bar connecting between the cells and an end cover for covering the bus bar plate. The cell module is configure to be fixed with the end cover.

17 Claims, 5 Drawing Sheets

CELL MODULE

CLAIM OF PRIORITY

This application claims priority from Japanese patent application serial No. 2008-003259, filed on Jan. 10, 2008, the content of which is hereby incorporated by reference into this application.

BACKGROUND OF THE INVENTION

The present invention relates to a cell module, particularly, to a cell module having a cell group with a plurality of cells connected to each other.

Generally, a power source device has a cell module with many cells connected each other to obtain high power, and if necessary, more cell modules are further combined. For example, a power source device for vehicles adopts to combine many cell modules and mounts them on the vehicles.

As an example described above, a technique is disclosed in a Japanese laid open patent publication No. 1998-270095, in which many cell modules with cells connected each other are attached to an end plate including a bus bar for conducting many cells connected each other, the end plate is fixed to a holder case, the holder case is attached to an outside case, and the outside case to vehicles.

On the other hand, a lithium ion battery is used as cells constituting the cell module, for example. When reached an abnormal state such as over-discharge or the like in the lithium ion battery, gas occurs from a power generation element such as an activated substance, electrolyte fluid or the like. In the case of closed type, the occurred gas raises an internal pressure of the cell. If the internal pressure continues to rise up, the cell finally goes to be burst.

Therefore, a gas discharge mechanism for discharging the gas is provided and when the internal pressure is reached to a predetermined value, the gas discharge mechanism starts discharging the generated gas. As the generated gas in the power generation element becomes high temperature and high pressure, it is not suitable to discharge the gas from the cell module without appropriate treating. Therefore, a new mechanism is required for discharging the gas to the outside of the vehicles safely.

As such an example, a technique is disclosed in a Japanese laid open patent publication No. 2005-322434 in which the gas is diffused and the temperature and pressure are fallen down by accommodating the cell in the case, and disposing a gas opening portion of the cell and a through hole for discharging the gas to the outside of the case so as not to oppose each other.

SUMMARY OF THE INVENTION

The structure described on above, however, has a necessity to cover a cell terminal portion connecting between the cell and the bus bar to protect workers against high voltage. Therefore, the number of parts of the cell module increases, as a result, the cost and weight increases. Also, due to using a holder case for insuring cooling space and high strength in fixing the cell module to the vehicle, if making the number of the cell modules large to increase the power source device output, more cost and weight are required.

When intending the miniaturization of a case accommodating the cell according to the constitution disclosed in the Japanese laid open patent publication No. 2005 322434, reduction of the space for diffusing the gas discharged from the cell requires sufficient strength of the case against the high temperature and high pressure gas. Therefore, to secure safety, the case material needs high strength and heat resistance. Consequently, its cost increases.

Considering the above cases, an object of the present invention is to provide a cell module with safety and compact size.

To solve the above problems in the present invention, a cell module having a cell group with a plurality of cells connected to each other comprises a bus bar plate including a bus bar connecting between the cells, and an end cover covering the bus bar plate, thereby fixing the cell module using the end cover.

According to the present invention, it is capable of structuring integrally the end cover for covering the bus bar plate including the bus bar connecting between the cells and functioning as a protect cover against high voltage, and fixation portion for fixing the cell module as one parts, as a result, the number of structuring parts is decreased with maintaining safety.

In the present invention, the end cover is preferable to be arranged so as to sandwich the cell through the bus bar plate on both side ends of the cell. The cell has a gas discharge mechanism on the surface where the bus bar is fixed, and the bus bar and bus bar plate are preferable to have through holes for discharging the gas formed on the surface opposing to the gas discharge mechanism. Moreover, the end cover is desirable to be made of metal or resin.

The bus bar plate may have a protrusion or recession such as groove in the circumference of the through holes. The end cover is desirable to have an extruded portion projected towards the outside with respect to the bus bar plate. In addition, a seal member for preventing gas leakage is preferable to be arranged between the bus bar plate and the cell, and between the bus bar plate and the end cover.

The bus bar plate may have a gas discharge sleeve member for guiding gas discharged from the cell to the outside. In addition, it is preferable to arrange a discharge member for communicating between the gas discharge sleeve members and for discharging the gas discharged from the cell to the outside of the cell module. Also, A space is formed by both the bus bar plate and an end cover between them, and it is more preferable that the gas discharged from the cell strikes to the end cover member in the cell abnormal state and is guided through the space to the gas discharge sleeve member. Its action and effects are explained below in the best mode of the present invention.

DETAILED EXPLANATION OF THE PREFERRED EMBODIMENT

An embodiment in accordance with the present invention applied to a cell module mounted on an automobile is explained below referring to the drawings.

Figure 1:
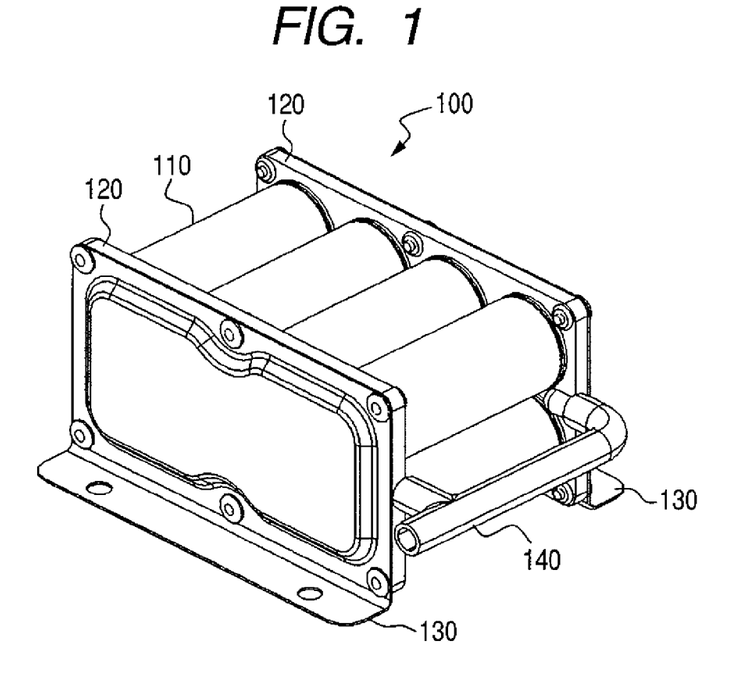
FIG. 1 is a perspective view showing the cell module appearance of the embodiment in accordance with the present invention.
Figure 2:
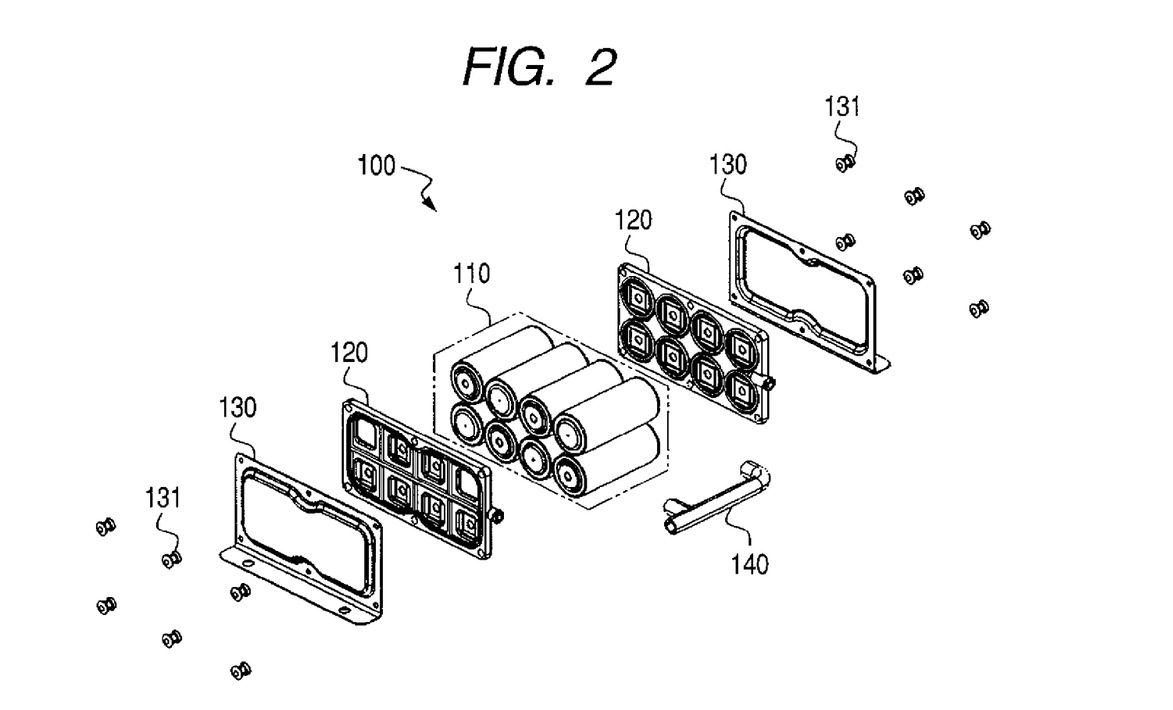
FIG. 2 is an exploded, perspective view showing the cell module.

As shown in FIGS. 1 and 2, a cell module 100 of the present embodiment, classifying generally, is composed of a cell group 110 with a plurality of cells 111 (shown in FIG. 3), bus bar plates 120 including bus bars (shown in FIG. 4) connecting between cells 111 structuring the cell group 110, end covers 130 fixed to the bus bar plates 120 and a vehicle, and a gas discharge tube 140.

The cell group 110 is composed of a plurality of cells 111, for example, eight cells in the present embodiment and their different polarity terminal portions of the cells 111 are disposed in parallel and alternatively. These cells 111 are electrically connected in series via the bus bars 121. The cell is desirable to use a cylindrical lithium cell using lithium manganate or the like as its main structural material and being applied as power sources of electric automobiles, hybrid cars and fuel cell automobiles.

Figure 3:
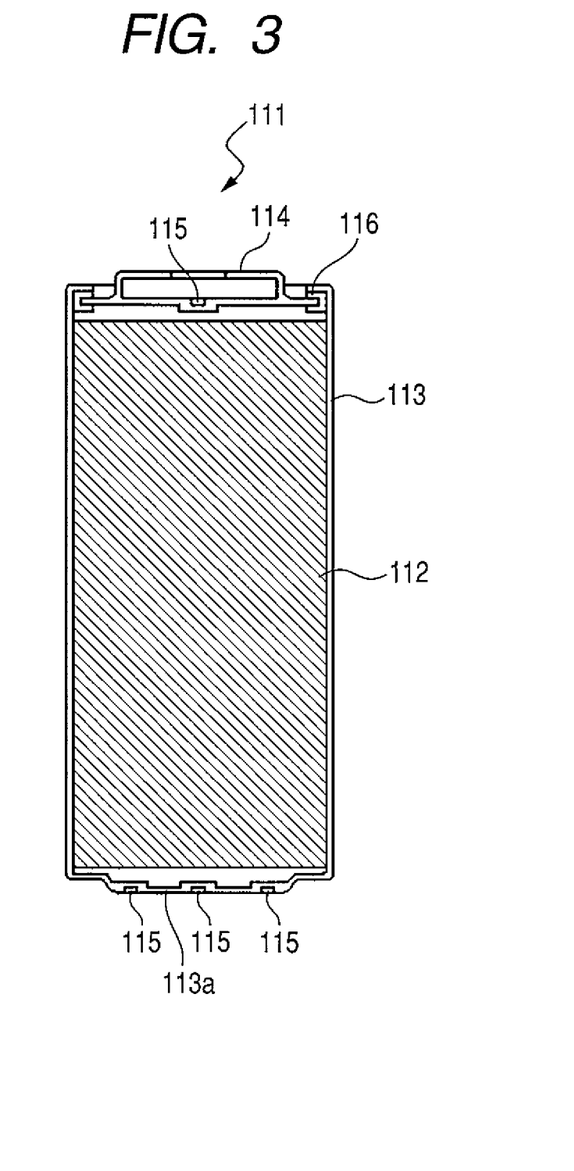
FIG. 3 is a sectional view showing schematically the cell constituting the cell group.

As shown in FIG. 3, in the cell 111 of the embodiment, a power generation element 112 surrounded by a positive electrode and negative electrode through a separator is accommodated in a cell case, namely, a cell can 113 (the positive electrode, negative electrode and separator are not shown in the drawing.) The negative electrode is connected to the cell case 113, and the positive electrode is connected to the cell terminal portion 114 for sealing the cell case 113 as a lid. The power generation element 112 is immersed in the electrolyte fluid (not shown). The cell terminal portion 114 is fixed to the cell case 113 by swaging through an insulation member or gasket 116. In a bottom 113$a$ of the cell case 113 and a bottom of the cell terminal portion 114, gas discharge mechanisms 115 are formed for bursting to discharge the gas to the outside in the cell abnormal state. The cell terminal 114 positioned on one end in the longitudinal direction has a positive polarity, on the other hand, the bottom portion 113$a$ of the other end of the cell case 113 has negative polarity, and both of these electrodes exposes. Additionally, a side circumference of the cell 111 is covered by a shrink tube (not shown) with heat contractibility.

Figure 4:
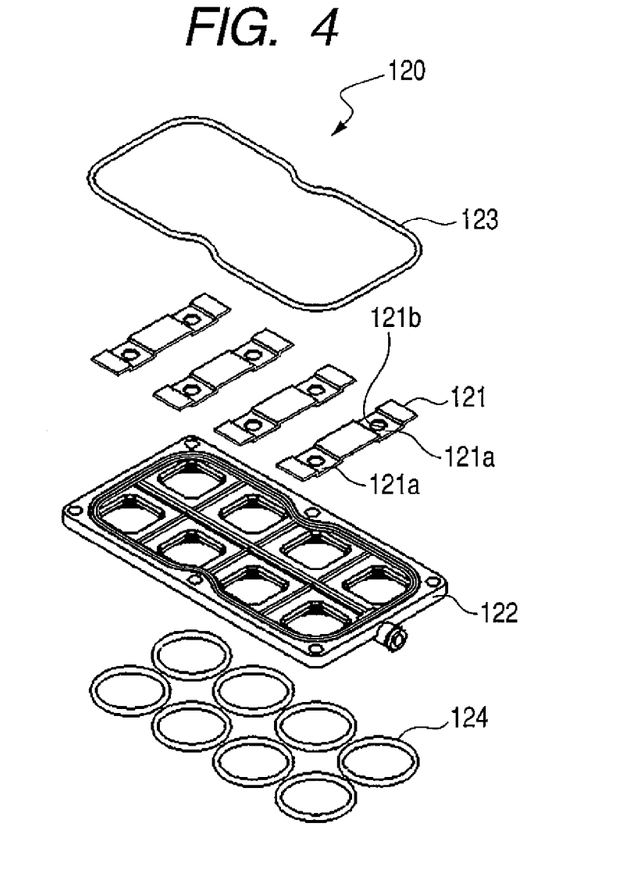
FIG. 4 is an exploded, perspective view of the bus bar plate constituting the cell module.

As shown in FIG. 4, the bus bar plate 120 has four bus bars 121 for connecting electrically between the cells 111, a resin plate 122 including the bus bars 121, an end cover seal member 123 with a nearly rectangular frame shape, and ring shaped eight cell seal members 124.

The bus bar 121 is made of metal plate such as iron, aluminum, copper or the like, and has recess portions 121$a$ lower than both end portions and the central portion between them. Circular through holes 121$b$ are formed in the center of the step portions 121$a$. The bus bars 121 are mechanically fixed to the resin plate 122 by an insert molding or tight inserting or the like.

The cell seal member 124 is made of rubber such as EPDM (ethylene-propylene rubber) or the like, and attached to one side (bottom side) of the resin plate 122 by an additional molding or assembling. Therefore, when the cell 111 and the bus bar 121 are fixed and joined at a predetermined position, necessary air tightness is assured by compressing and deforming of the cell seal member 124 and resultant caused reaction force.

The end cover seal member 123 is also made of rubber such as EPDM or the like and attached to the resin plate 122 by the additional inserting or assembling. Therefore, when an end cover 130 (shown in FIGS. 1 and 2) and the bus bar plate 120 are fixed and joined at a predetermined position, necessary air tightness may be insured by compressing and deforming of the end cover seal member 123 and resultant caused reaction force.

Figure 5:
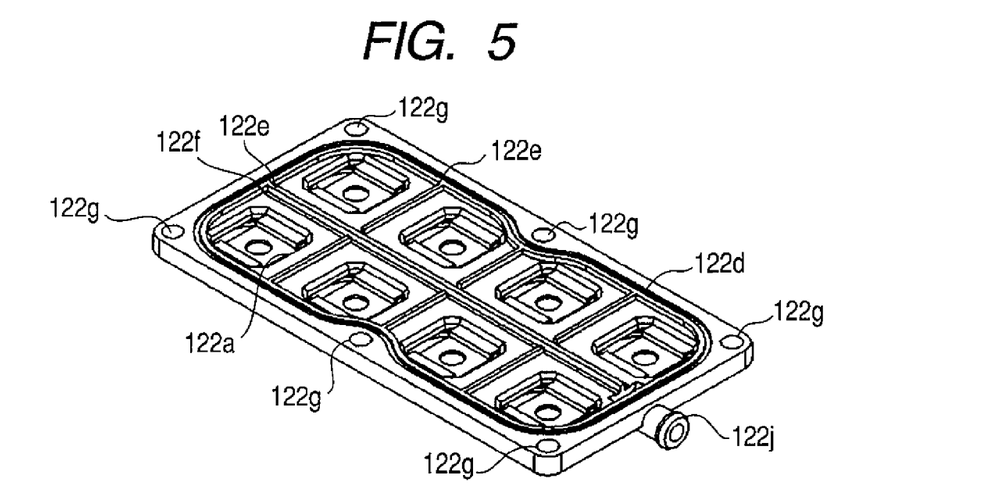
FIG. 5 is a perspective view of the attaching side of a resin plate constituting a bus bar plate.
Figure 6:
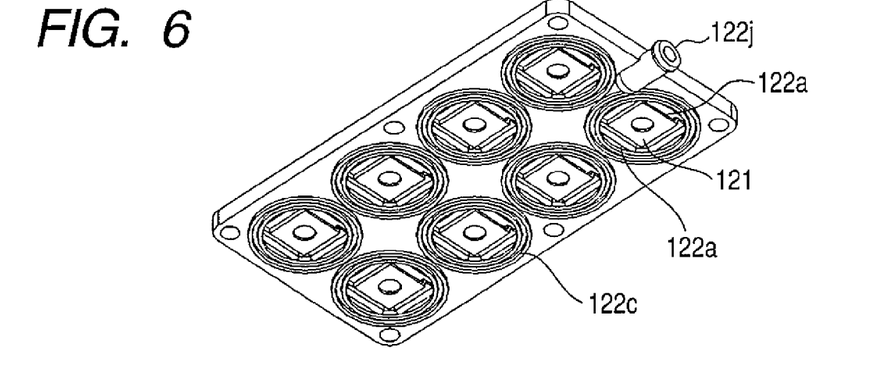
FIG. 6 is a perspective view of the attaching side of the cell of the resin plate.
Figure 7:
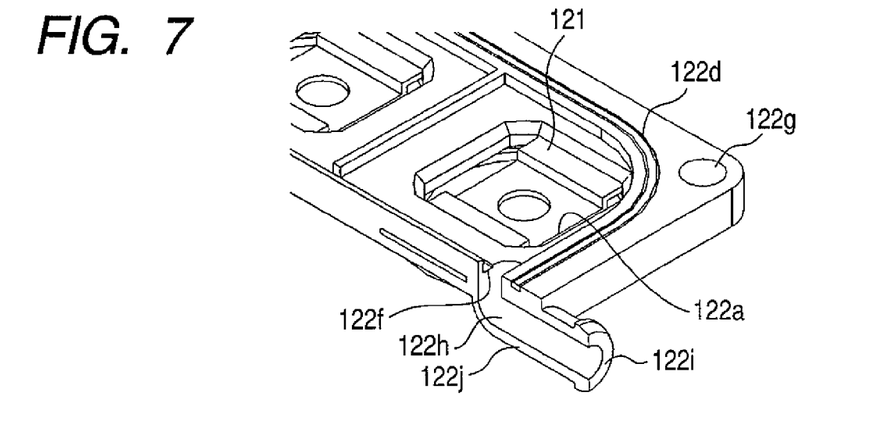
FIG. 7 is a partially broken, perspective view showing of the bus bar plate before attaching the end cover seal member.

As shown in FIG. 5, the resin plate 122 has same number of rectangular shaped through holes 122$a$ as that of the cells 111 at a position corresponding to the recess portions 121$a$ of the included bus bars 121, that is, the through holes 121$b$ as shown in FIG. 6 and FIG. 7. As shown in FIG. 6, on the one side surface (bottom surface) where the cells 111 are fixed, and in each circumference of the through holes 122$a$, the resin plate 122 is provided with each annular shaped groove 122$c$ for attaching each cell seal member 124 and for positioning and preventing displacement of the cell seal member 124. The annular shaped groove 122$c$ is formed between double annular shaped protrusions 122$c'$ formed in the circumference of the through holes 122$a$.

On the other hand, on a surface side where the end cover 130 is fixed as shown in FIG. 5 and FIG. 7, the resin plate 122 is provided with a nearly rectangle line groove 122$d$ for attaching the end cover seal member 123 and for positioning and preventing displacement of the end cover seal member 123. The nearly rectangle line groove 122$d$ is formed between double rectangle shaped protrusions 122$d'$ formed on the surface of the resin plate 122. In addition, the resin plate 122 is provided with straight line shaped protrusion 122$e'$ in a center line of a longitudinal direction of the resin plate 122 and between adjacent through holes 122$a$ in a direction intersecting the center line on a surface side where the end cover 130 is attached so as to partition between the end portion of respective cell 111 namely so as to divide between the through holes 122$a$. Additionally a straight line groove 122$f$ is formed on both sides of the straight line shaped protrusions 122$e'$ along the protrutions 122$e'$. Moreover, a plurality of attachment holes 122$g$ are formed for fixing the end cover 130 in the circumference of the resin plate 122.

In addition, as shown in FIG. 5 to FIG. 7, a discharge sleeve member 122$j$ with a discharge hole 122$h$ is to guide gas discharged from the cell 111 to the outside of the cell module 100 in the cell abnormal state, and the discharge hole 122$h$ is provided over the straight line groove 122$f$ and the rectangle line groove 122$d$ on the center line in the longitudinal direction of the resin plate 122 so as to communicate with both grooves 122$f$ and 122$d$. The discharge sleeve member 122$j$ has a ferrule 122$i$ on an end side for attaching a gas discharge tube 140 (refer to FIG. 2) as shown in FIG. 7.

Figure 8:
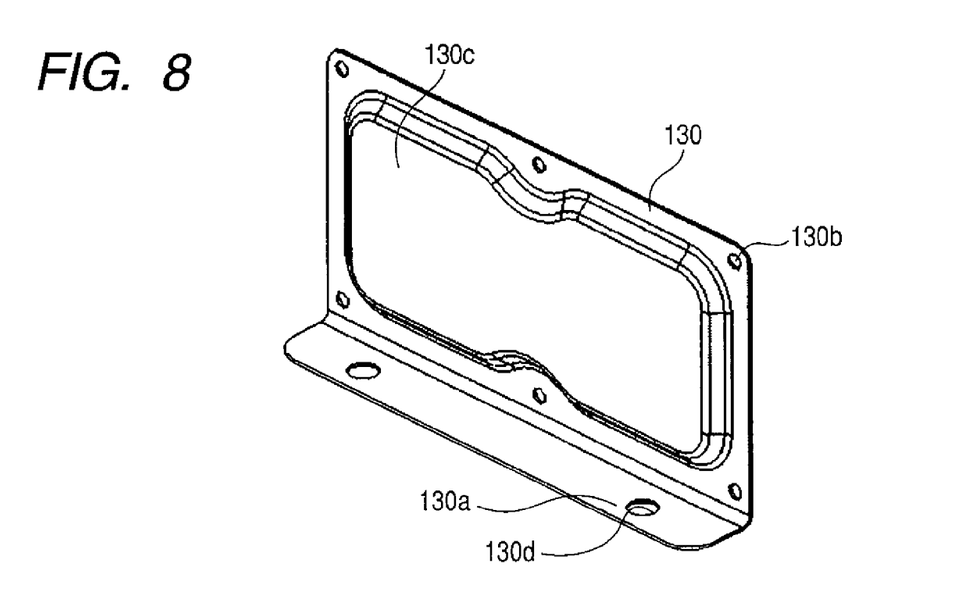
FIG. 8 is a perspective view of the end cover constituting the cell unit.

The end cover 130 is made of a press-molding metal plate such as iron and aluminum, or resin mold such as PBT (polybutylene terephtalene) or the like. As shown in FIG. 8, the end cover 130 has an extruded portion 130 with a flat top face protrude to the outside with respect to the bus bar plate 120 in the central portion. A flange 130$a$ is provided on the bottom of the end cover 130, the flange is bent perpendicularly to fix the cell module 100 to the car or the power source device. In the circumference of the center portion (extrude portion 130), mounting holes 130$b$ is provided for fixing the end cover 130 to the bus bar plate 120, and the flange 130$a$ has a mounting hole 130$d$ for fixing the cell module to the car or the power source device.

The end cover 130 is fixed to an assembly in which the cell group 110 and the bus bar plates 120 or the like are connected to each other with fixing members 131 such as bolt, screw, or the like, as shown in FIG. 2. The end cover 130 also forms a gas reservoir space 150 through cooperating with the bus bar plates 120, strictly speaking, cooperating with the cell 111, the end cover seal member 123 and the cell seal member 124 in addition to the two of the end cover 130 and bus bar plates 120. The gas reservoir space 150 is air-tightly closed and communicated with the discharge hole 122h formed in the discharge sleeve member 122j.

The gas discharge tube 140 is formed by rubber or resin or the like, and connection part is branched off from one tube as shown in FIG. 1, and its branched end portion is fixed to a ferrule 122i of the guide 122j by a band (not shown). Accordingly, the end cover 130 is arranged on both sides of the cells 111 so as to sandwich the cell 111 through the bus bar plate 120, and the gas discharge tube 140 communicates with the discharge holes 122h of the discharge sleeve member 122j or to gas reservoir spaces 150.

[Operation]

Next, the operation in the cell abnormal state is explained on the cell module 100 of the embodiment.

According to the above arrangement, the cell module 100 in the embodiment is able to perform electric power charging and supplying as a secondary battery. Then, if caused short-circuiting internally by over voltage, break down by pressing or sticking or the like in the cell structuring the cell group 110, that is in the cell abnormal state, the power generation element 112 may be heated abnormally and generates gas from the electrolyte fluid and/or activated substances, or the like. When the gas generates, the internal temperature and pressure in the cell case 113 rises up. If the internal pressure of the cell housing 113 reaches to a predetermined value, the gas discharge mechanism 115 operates to communicate the internal cell housing with the gas reservoir space 150.

The gas discharging direction of the gas discharge mechanism 115 intersects each surface of the bus bar 121, the resin plate 122 and the end cover 130, and the high temperature and high pressure gas discharged from the gas discharge mechanism 115 passes through the through hole 121b formed in the bus bar 121 and the through hole 122a of the resin plate 122 to eject the gas through the gas reservoir space 150 towards the extruded portion 130c of the end cover 130.

Figure 9:
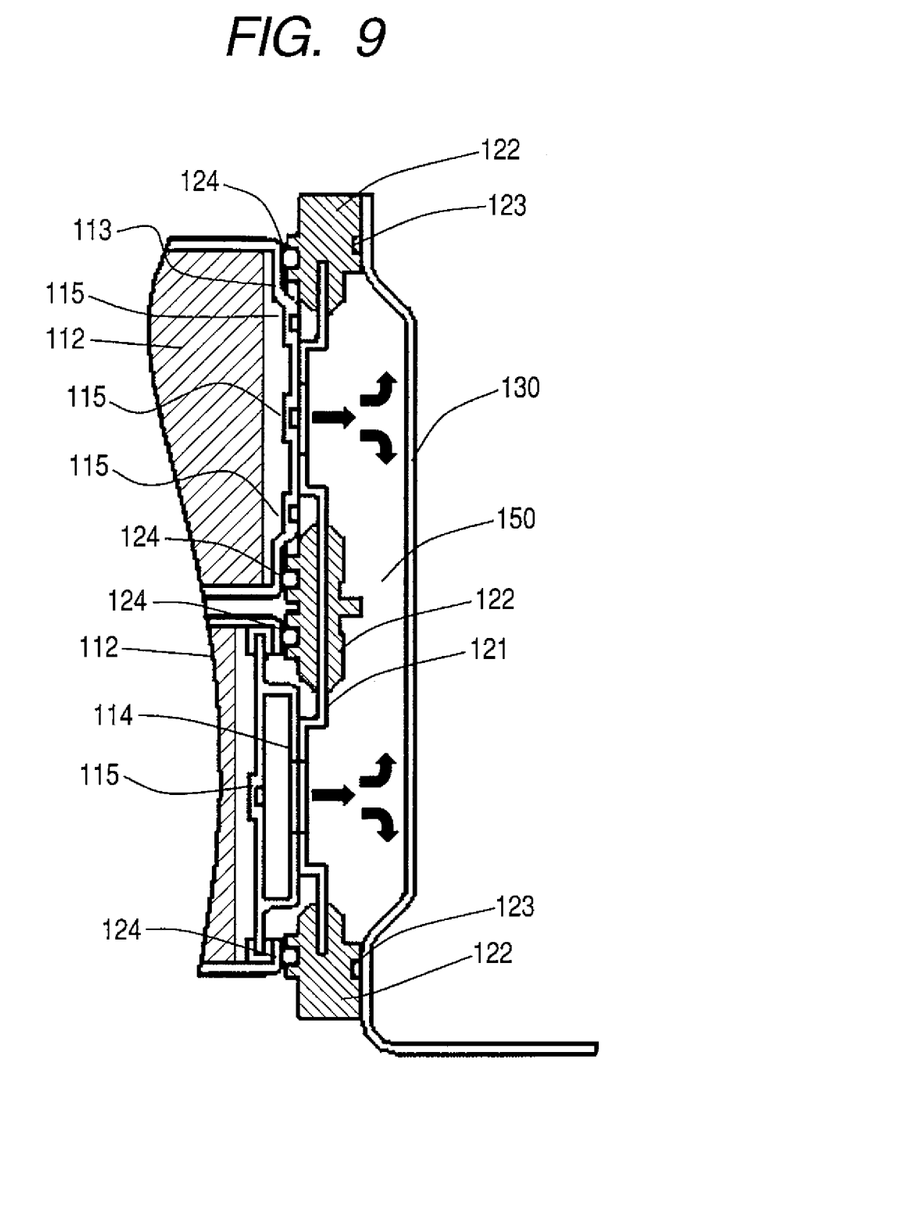
FIG. 9 is a partial sectional view of the cell module, showing schematically the progressing direction of gas discharged from the gas discharge mechanism in the cell abnormal state.

FIG. 9 is a schematic view showing a progressing direction of the gas discharged from the gas discharge mechanism 115 in the cell abnormal state. The gas discharged from the discharge mechanism 115 charges to the extruded portion 130c of the end cover 130 and diffuses in the gas reservoir space 150. The diffused gas makes convection in the gas reservoir space 150, and then the gas is introduced to the discharge hole 122h provided on the resin plate 122 and discharged through the gas discharge tube 140 to the outside of the cell module 100.

[Advantages]

Next, effects and advantages are explained on the cell module 100 of the embodiment below.

In the present embodiment, the cell module 100 has a plurality of cell groups connected to each other, a bus bar plate 120 including a bus bar 121 connecting between the cell 111 and the end cover 130 covering the bus bar plate 120, and is mounted on the car or the power source device using the end cover 130. That is, the end cove 130 covering the bus bar plate 120 connecting between the cells 111 and functioning as a protection cover against the high voltage, and a flange fixing the cell module to the car or power source are formed integrally as a unit parts. Therefore, maintaining safety, namely, the strength, heat resistance of the whole module and reduction of influences on the devices arranged around the cell module 100, the cell module 100 is capable of reducing the number of the structural parts and its size.

Further, according to the cell module 100 of the embodiment, the cell 111 has a gas discharge mechanism unit 115 on the surface side where the bus bar 121 is attached, and both of the bus bar 121 and the resin plate 122 have through holes 121b and 122a formed respectively on the surface in opposition to the gas discharge mechanism 115 of the cell. Accordingly, the resin plate 122 receives no gas discharged from the cell 111 and, as a result, it is possible to decrease the necessary cost, strength and heat resistance of the resin plate 122.

Furthermore, in the cell module 100 of the embodiment, the end cover 130 is structured with metal or resin. In the case of metal, high strength parts is capable of directly receiving high temperature and the high pressure gas just after discharged from the cell 111 for protecting the cell, and overlapping its functions, and accordingly, reducing cost as well as weight. Also, in the case of resin, further it is possible to make weight reduction.

Furthermore, in the cell module 100 of the embodiment, each annular shaped groove 122c is formed in the circumference of the through hole 122a of the resin plate 122. Therefore, It is capable of preventing short-circuit between the cells 111 caused by the electrolyte fluid discharged simultaneously with gas from the cell 111.

Moreover, in the cell module 100 of the embodiment, the bus bar extruded portion 130c projecting to the outside in opposition to the bus bar plate 120 is formed on the end cover 130. Therefore, it is possible to form a gas reservoir space 150 enough to diffuse the high temperature and high pressure gas discharged from the cell 111, and consequently it is capable of reducing the load of the seal member such as the end cover seal member 123, the cell seal member 124 or the like.

Furthermore, the cell module 100 has the cell seal member 124 for gas prevention and fluid leakage prevention between the resin plate 122 and the cell 111 in the embodiment. Therefore, the high temperature and high pressure gas and the electrolyte fluid discharged from the cell 111 are able to be stored in the gas reservoir space 150.

The cell module 100 of the embodiment, the bus bar plate 120 has the discharge sleeve member 122j for guiding the gas discharged from the cell 111 to the outside of the cell module. Therefore, it is capable of discharging quickly the high temperature and high pressure gas and the electrolyte fluid discharged from the cell 111 from the cell module and therefore, decreasing necessary strength and heat resistance of the seal member and size of the gas reservoir space 150 and making the cell module compact.

Moreover, in the cell module 100 shown in the embodiment, since the end cover 130 is arranged so as to sandwich the group of the cell 111 through the bus bar plate on both side ends of the cell, and the gas discharge tube 140 communicates with the discharge hole 122j of the discharge sleeve member 122, thereby discharging the gas from the cell unit to outside of the cell module. Therefore, this structure enables to discharge high temperature and high pressure gas and the electrolyte fluid discharged from the cell 111 from an appropriate direction of the cell to the outside of it in the cell abnormal state.

Additionally, an example of the car use cell module 100 is shown in the embodiment, the present invention is not limited to this embodiment and broadly applicable to a power source system requiring large current charging and discharging. Also, the cell module 100 with eight cells connected in series is shown in the embodiment, the present invention, however, is not limited to the structure and connection, that is, series or parallel connection of the cell module 100 on the above. For example, the number of the cell 111 is variable, and the number of the cell constituting the cell group 110, its arrangement and direction are appropriately variable.

While the cylindrical lithium battery is shown as an example of the cell 111 in the embodiment, the present invention is not limited to this constitution. For example, the shape of the cell may be rectangular or polygon and use a battery cell covered by a laminate film. Excepting the lithium battery, other batteries are applicable such as a nickel hydrogen battery or the like.

The present embodiment shows a most simple flange 130a bent perpendicularly, that is, the section of whole end cover being L-shaped, for attaching the end cover 130 to the car or the power source device, the present invention, however, is not limited to this structure. For example, a channel shaped flange 130a is suitable. Furthermore, a fixing hole 130d for fixing the cell module to the car or the power source device, if necessary, a cell case, hybrid unit or the like is shown, however, a flange unifying with an attaching member such as nuts is suitable to be used without limitation.

Additionally, only one gas discharge tube 140 is arranged on the side surface of the cell module 110 in the embodiment, the present invention, however, is not limited to this constitution. For example, one more gas discharge tube may be arranged on a side surface opposing to the side surface of the cell module 100 which the gas discharge tube is disposed in the embodiment, and a plurality of discharge outlets are prefer to be used without limiting the number of the outlet. Also, the discharging direction or position of the gas discharge tube 140 are able to be changed appropriately according to the application of the cell module 100.

According to the embodiment present invention, an end cover covering the bus bar plate including the bus bar connecting between the cells and functioning as a protection cover against the high voltage and a fixing part fixing the cell module are able to be integrally formed as one unified parts. Therefore, the number of the structural parts may be decreased, maintaining its safety.

[Applicability to the Industrial Use]

As providing the compact cell module with maintaining the safety and being capable of contributing to the cell module manufacturing as well as selling, the present invention has an applicability of the industrial use.

What is claimed is:

1. A cell module, having a cell group with a plurality of cells, comprising:
   a bus bar plate, including a bus bar configured to electrically connect said plurality of cells; and
   an end cover configured to cover said bus bar plate;
   wherein said end cover is provided with a fixation part configured to fix said cell module to an object on which said cell module is mounted;
   wherein a cell of said plurality of cells has a gas discharge mechanism, disposed on a surface thereof to which said bus bar is attached;
   wherein a gas reservoir space is formed between said end cover and said bus bar plate including said bus bar, the gas reservoir space configured to receive gas discharged from the cell; and
   wherein said bus bar and said bus bar plate each have a through hole respectively formed on a surface thereof opposite to said gas discharging mechanism, said respective holes both configured to enable discharge of internal gas from said cell to said gas reservoir space.

2. The cell module according to claim 1, wherein an end cover is arranged on each of two opposite ends of said plurality of cells, so as to sandwich therebetween said plurality of cells and said bus bar plate.

3. The cell module according to claim 1, wherein said end cover is made of metal or resin.

4. The cell module according to claim 1, wherein said bus bar plate has a protrusion or recess portion within a circumference of said through hole of said bus bar plate.

5. The cell module according to claim 1, wherein a seal member for preventing gas leakage is arranged between said bus bar plate and said plurality of cells, and between said bus bar plate and said end cover.

6. The cell module according to claim 1, further comprising:
   a gas discharge member for guiding gas discharged from said cell to outside said cell module.

7. The cell module according to claim 6, further comprising a discharging tube configured to communicate with the gas discharge member, and thereby direct gas discharged from said plurality of cells to outside of said cell module.

8. The cell module according to claim 6, wherein a space is formed between said bus bar plate and said end cover, such that when the cell is in an abnormal state, discharged gas from said cell is guided through the space by said gas discharge member.

9. A cell module, having a cell group with a plurality of cells, comprising:
   a bus bar plate, including a bus bar configured to electrically connect said plurality of cells; and
   an end cover configured to cover said bus bar plate;
   wherein a cell of said plurality of cells has a gas discharge mechanism, disposed on a surface thereof to which said bus bar is attached;
   wherein a gas reservoir space is formed between said end cover and said bus bar plate including said bus bar, the gas reservoir space configured to receive gas discharged from the cell;
   wherein said bus bar and said bus bar plate each have through holes, said respective holes both configured to enable discharge of internal gas from said cell to said gas reservoir space; and
   wherein said through holes are formed on respective surfaces of said bus bar and said bus bar plate opposite to the gas discharging mechanism.

10. A cell module having a cell group with a plurality of cells, comprising:
   a plurality of bus bar plates, each arranged on an opposite end of said plurality of cells, so as to sandwich said plurality of cells and to mechanically fix a bus bar configured to electrically connect said plurality of cells; and
   an end cover configured to cover a bus bar plate on a side opposite to said plurality of cells;
   wherein a gas reservoir space is formed between said end cover and said bus bar plate, and configured to receive gas discharged from a cell through said bus bar;
   wherein said bus bar and said bus bar plate each have through holes, said respective holes both configured to enable discharge of internal gas from said cell to said gas reservoir space;
   wherein said bus bar plate is provided with a gas guide member configured to guide the discharged gas from said gas reservoir to outside of said cell module; and
   wherein said end cover is provided with a fixation part configured to fix said cell module to an object on which said cell module is mounted.

11. A cell module comprising:
   a plurality of cells disposed side by side, so that their different polarity terminal portions are alternately disposed, the cells being cylindrical in shape;

a pair of resin plates, each arranged on an end of said plurality of cells so as to sandwich together said plurality of cells;

a plurality of bus bars, each bus bar configured to electrically connect between said different polarity terminal portions on one of two opposite ends of a subset of said plurality of cells, so that said plurality of cells are connected to each other in series;

a metal end cover configured to cover a surface of said resin plate not in contact with said plurality of cells;

a gas reservoir space formed between said resin plate and said metal end cover, to which gas is discharged from said plurality of cells through said bus bars;

wherein said bus bars and said resin plates have through holes, said through holes configured to enable discharge of internal gas from said cell to said gas reservoir space;

a gas guide member having a thorough hole, that is integral with said resin cover, to guide the gas accumulated in said gas reservoir to outside of said resin cover; and a discharging tube attached to the gas guide member, and configured thereby to discharge the gas guided by said through hole to outside of said module.

12. The cell module according to claim 11, wherein each of said plurality of cells is provided with a gas discharge mechanism at each of said terminal portions, and wherein each of said bus bar and said bus bar plate is provided with through holes configured to pass gas discharged from each cell.

13. The cell module according to claim 12, wherein said resin plate is provided with an annular groove for attaching a seal member in a circumference of said through hole on a surface of a cell side.

14. The cell module according to claim 11, wherein said end cover has a fixation part projecting away from said resin plate.

15. The cell module according to claim 11, wherein a seal member is provided between said end cover and said resin plate.

16. The cell module according to claim 11, wherein one end of said guide member is provided with a ferrule for attaching said discharging tube.

17. The cell module according to claim 11, wherein said discharging tube is divided into plural tube portions, and wherein respective ends of the divided tube portions are connected to respective guide members of said resin plate.

* * * * *